United States Patent [19]

Wilson

[11] Patent Number: 5,129,092
[45] Date of Patent: Jul. 7, 1992

[54] LINEAR CHAIN OF PARALLEL PROCESSORS AND METHOD OF USING SAME

[75] Inventor: Stephen S. Wilson, Ann Arbor, Mich.

[73] Assignee: Applied Intelligent Systems, Inc., Ann Arbor, Mich.

[21] Appl. No.: 57,128

[22] Filed: Jun. 1, 1987

[51] Int. Cl.$^5$ .............. G06F 15/80; G06F 7/50; G06F 15/62; G06K 9/54

[52] U.S. Cl. .................. 395/800; 364/784; 364/DIG. 1; 364/228.3; 364/229.1; 364/231.9; 364/245.7; 364/247.1; 364/254.4; 364/255; 364/258; 364/258.1; 364/229.2; 364/230.3; 364/230.4; 382/27; 382/49

[58] Field of Search ... 364/200 MS File, 900 MS File, 364/784, 785, 788; 382/27, 49

[56] References Cited

U.S. PATENT DOCUMENTS

| | | | |
|---|---|---|---|
| 3,537,074 | 10/1970 | Stokes et al. | 364/200 |
| 3,582,899 | 6/1971 | Semmelhaack | 364/200 |
| 3,970,993 | 7/1976 | Finnila | 364/200 |
| 4,174,514 | 11/1979 | Sternberg | 364/200 |
| 4,215,401 | 7/1980 | Holsztynski et al. | 382/41 |
| 4,314,349 | 2/1982 | Batcher | 364/900 |
| 4,525,797 | 6/1985 | Holden | 364/788 |
| 4,621,339 | 11/1986 | Wagner et al. | 364/900 |
| 4,731,724 | 3/1988 | Michel et al. | 364/200 |
| 4,736,288 | 4/1988 | Shintani et al. | 364/200 |
| 4,739,474 | 4/1988 | Holsztynski | 364/200 |
| 4,787,057 | 11/1988 | Hammond | 364/754 |
| 4,829,585 | 5/1989 | Pape | 382/41 |

FOREIGN PATENT DOCUMENTS

0006748 1/1980 European Pat. Off.
0150449 8/1985 European Pat. Off.

OTHER PUBLICATIONS

Fisher, A. L., "Scan Line Array Processors for Image Computation," *IEEE Conference Proceedings of the 13th Annual International Symposium on Computer Architecture*, pp. 338-345 (Jun. 2-5, 1986).

Budzinski et al., "A Restructurable Integrated Circuit for Implementing Programmable Digital Systems," *Computer*, vol. 15, No. 3, pp. 43-54, (Mar. 1982).

Fountain, P. J., "A Survey of Bit-Serial Array Processor Circuits," *Computing Structures for Image Processing*, pp. 1-14 (1983).

Danielsson, P-E., "Lipp-Proposals for the Design of an Image Processor Array," *Computing Structures for Image Processing*, pp. 157-178, (1983).

O'Leary, D. P., "Systolic Arrays for Matrix Transpose and Other Reorderings," *IEEE Transactions on Computers*, vol. C-36, No. 1, (Jan. 1987).

Fisher et al., "Real-Time Image Processing on Scan Line Array Processors," IEEE Work Shop on Pattern Analysis and Image Data Base Management, pp. 484-489 (Nov. 18-20, 1985).

Kondo et al., "An LSI Adaptive Array Processor," *IEEE Journal of Solid-State Circuits*, vol. SC-18, No. 2, pp. 147-156 (Apr. 1983).

(List continued on next page.)

Primary Examiner—Gareth D. Shaw
Assistant Examiner—Matthew C. Fagan
Attorney, Agent, or Firm—Dykema Gossett

[57] ABSTRACT

A system for processing data matrices such as images and spatially related data includes a plurality of neighborhood processing units connected in a linear chain with direct data communication links between adjacent processing units. A sequence of instructions are sent to the processing units by a single controller, where all neighborhood processing units in the system receive the same instruction at any given cycle in the instruction sequence. The width of the data matrix array is the same as a number of processors, so that there is one processor per column in the data matrix. The memory associated with each processor is external and large enough to hold the entire image or data matrix. The processors are able to operate arithmetically in a serial or parallel mode, where an efficient means is provided to transpose 8×8 bit submatrices between the two modes. An indirect addressing means is provided which operates on byte-wide memories external to the processing unit.

33 Claims, 7 Drawing Sheets

OTHER PUBLICATIONS

Graham et al., "Parallel Algorithms and Architectures for Optimal State Estimation," *IEEE Transactions on Computers*, vol. C-34, No. 1, (Nov. 1985).

Wilson, S. S., "The Pixie-5000—A Systolic Array Processor," *Work Shop on Computer Architecture for Pattern Analysis and Image Data Base Management*, pp. 477–483 (1985).

Strong, J. P., "Basic Imaging Processing Algorithms on the Massively Parallel Processor," *Multicomputers and Image Processing*, pp. 48–52 (1982).

Ralston et al., Encyclopedia of Computer Science and Engineering, pp. 14–15 and 714 (2nd Ed. 1983).

LINEAR CHAIN OF PARALLEL PROCESSORS AND METHOD OF USING SAME

BACKGROUND OF THE INVENTION

This invention relates to systems and methods for the processing and analysis of spatially related data arrays such as images, by means of a large array of programmable computing elements.

A number of systems have been developed which employ a large array of simple bit serial processors, each receiving the same instruction at any given time from a central controller. These types of systems are called "Single Instruction Multiple Data" (SIMD) parallel processors. There are various methods for communicating data from one processor to another. For example, the massively parallel processor described in K. E. Batcher, "Design of a Massively Parallel Processor," IEEE Transactions on Computers, Setp. 1980, pp. 836-840, contains an array of 128×128 processors where image processing is an important application. Data is communicated between neighboring processing elements when an instruction that requires a neighborhood operation is performed. Image data arrays with dimensions larger than 1024×1024 are not uncommon. Since processor arrays this large are not economically feasible, the array must be broken into smaller data array sizes with dimensions equivalent to the size of the processor array. There are other types of SIMD processors, but they also generally experience the problem of data arrays larger than the processor array. Generally, for all these systems, all the memory associated with the processors is not large enough to hold the entire image along with extra memory capacity for intermediate computational results.

Thus, a large external memory is necessary, and mechanisms must be able to handle the input and output of small subarray segments at high speed to preserve computing efficiency. Even if enough memory were supplied to each processor, so that the total memory associated with the ensemble of processors could contain the entire large array of image data, there would still remain the problem of communicating data between the various subarrays when neighborhood operations are performed. During an instruction clock cycle, every processor receives the output of its associated memory, so that processors on the edges of the array cannot receive data from neighboring subarrays because all memories are already engaged in reading an entire subarray. Thus, multiple clock cycles would be needed in reading data when subarray and neighboring subarray data are both needed in a computation. Generally, SIMD processors are less efficient in handling global processes where large areas of the data matrix must be analyzed, such as in histograms, feature extraction, and spatial transforms, such as the Hough transforms, and Fourier analysis.

Indirect addressing is an important processing concept, but the difficulties with implementing it in a parallel processing environment have been recognized in the literature. See for example: A. L. Fisher and P. T. Highnam, "Real Time Image Processing on Scan Line Array Processors," IEEE Workshop on Pattern Analysis and Image Database Management, Nov. 18-20, 1985, pp. 484-489; and P. E. Danielson and T. S. Ericsson, "LIPP-Proposals for the Design of an Image Processor Array", chap. 11, pp. 157-178, COMPUTING STRUCTURES FOR IMAGE PROCESSING (Ed. M. J. B. Duff, Academic Press 1983). Large amounts of memory are required for indirect addressing to be useful because applications such as look-up-tables or histograms which can benefit from indirect addressing also require a large amount of memory. In SIMD processors the memory is generally integrated on the same chip as the processor, but technology limits the integration of both processors and memory on one chip so that the memory is too small for indirect addressing to solve any useful problems using these technologies. However, if the memory is outside the chip, then for a large number of integrated processors on a chip, there are too many address lines that the processors must handle, so that the number of signal paths is a strong limiting factor.

Since all processors simultaneously perform the same instructions in SIMD processor arrays, it has been recognized that a method is required to prevent some selected processors from performing the instructions, according to data values within the associated memory. Usually, a memory write inhibit function is used where a programmable flip-flop controls the the write function for each memory in the array. However, the write inhibit function requires an extra line from the processor chip to the associated memory chip. Because of output pin limitations on the circuit chips, not too many processors can be integrated on a single chip. Also, cost effective byte-wide memories could not be utilized because the eight separate data lines cannot be separately inhibited.

Therefore, a primary object of the present invention is to provide a simple method to allow a fixed array of processors to handle a large array of data while performing operations which require neighborhood and global processing of data.

Another object of the invention is to provide an effective method of indirect addressing of memory which operates independently for each SIMD processor in the array.

A further object of the invention is to provide a means of handling large arrays of data without resorting to memories and associated input and output mechanisms remote from the processing array.

SUMMARY OF THE INVENTION

This invention relates to a method of handling the processing of rectangular arrays of data where the entire data arrays is held in memory associated with an array of processing elements. In the method of this invention, a plurality of identical individual processing units are connected in a linear chain, where there is one processing element per column of the data matrix, and each processing unit is coupled to a large enough memory to contain the entire height of the data matrix. The identical processor units have connections to adjacent neighboring units and communicate neighborhood data therewith.

The processor unit employs a highly flexible accumulator therein which is used as a means for incrementing data, a wideband data communication means, a means for transposing 8×8 data subarrays, and a register for indirect addressing. The combination of accumulator functions allow external byte-wide memories to be used and still provide operations which would otherwise be impossible. The transpose means allows data which is generally treated as bit serial, to be converted to parallel byte-side data. Furthermore, the processor unit has a novel mode of operation where parallel arithmetic functions can be performed. Also, a two-level multiplexer within each processor unit is capable of performing both look-up-table functions and bit serial arithmetic functions.

In light of the foregoing problems and objects, there is provided, according to one aspect of my invention, a processing system for performing parallel processing operations upon data from an array of data having a plurality of rows and at least two n columns where n is an integer greater than one, by subdividing the large array into at least first and second subarrays for processing, where each subarray has a plurality of rows and only n columns. The system comprises: first and second groups of n individual processor units each, with each such group including an array of n processor cells which are linked together by a plurality of connections, with each of the individual processor units including one of the processor cells, and the first and second groups of processor units being linked together by a plurality of connections for transferring data between the groups; and first and second groups of n memory means each for storing m columns of data respectively associated with the first and second sub arrays, with each such memory means storing one column of data, and being associated with and connected to a respective one of the processor units. In this system, the first group of processor units further include first means for selectively allowing the first group of processor units to operate in parallel on rows of data from the first group of n memory means, and second means for selectively allowing the first group of processor units to operate in parallel upon data from anyone of the n columns of the first group of n memory means. In a similar fashion, the second group of processor units further includes first means for selectively allowing the second group of processing units to operate in parallel upon data from rows of the second group of n memory means, and second means for selectively allowing the second group of processor units to operate upon data in parallel from any one of the n columns of the second group of n memory means. In this system, each processor unit preferably includes accumulator means, which which may consist of individual one-bit accumulators serially linked together, with each accumulator means being linked together by a plurality of connections to at least one accumulator means associated with an adjacent processor unit.

According to a second aspect of the invention, there is provided an improvement for transposing data in a processing system for performing parallel processing operations upon data from an array of data having a plurality of rows and at least two n columns, where n is an integer greater than one. The improvement comprises in combination: an array of n individual processor units which includes an array of processor cells linked together by a plurality of connections; an array of n memory means for storing data for subsequent processing by the array of n individual processor units, with each of the memory means being associated with a respective one of the processor units, and each of the memory means being arranged for storing one column of data; and means for transposing n bits of data as such bits are transferred between the array of n memory means and the array of processor units which alters the organization of the data from a first format to a second format which is orthogonal to the first format.

According to a third aspect of the present invention, there is provided a method of transferring data between an array of processor units and an array of memory means in a processing system for performing processing operation in parallel upon data from an array of data having at least n rows and n columns, where n is an integer greater than one. The method comprises the steps of: (a) storing the data in one format in the array of n memory means, and (b) transferring a group of data stored in the first format in the array of n memory means to the array of n processor units by transposing the data being transferred to a second format orthogonal ot the first format.

According to a fourth aspect of the present invention, there is provided an improvement for performing arighmetic operations in a processing system for performing processing operations in parallel upon data from an array of data having at least a plurality of rows and n columns, where n is an integer greater than one. The improvement comprises in combination: an array of n individual processor units which include an array of n processor cells which are linked together by a plurality of connections; an array of n memory means, with each memory means being for storing a column of data for processing by a processor unit associated with the memory means, the array of processor units further including an array of arithmetic means for performing arithmetic operations upon data provided thereto, and carry means for transferring data corresponding to carries resulting from the arithmetic operations between processor units, such that the array of n processing units may be operated in parallel to perform arithmetic operations with data that is distributed along the array of processor units.

According to a fifth aspect of the present invention, there is provided a method for performing arithmetic operations in a processing system of the type described in the fourth aspect of the present invention. The method for performing the arithmetic operation comprises the steps of: (a) providing, as at least part of the processing system, an array of n processor units which are linked together by a plurality of connections, the array processor units including means for transferring carry data between processor units which are adjacent to one another; and (b) performing arithmetic operations in each of the n processor units in parallel, by at least in part allowing carry data generated as a result of an arithmetic operation in one processor unit to be promptly transferred in one direction to an adjacent processor unit, if any in that direction, where the transferred carry data is utilized in the arithmetic operation being performed in the adjacent processor unit.

According to a sixth aspect of the present invention, there is provided an improvement which allows data within the array of memory means in a processing system for performing parallel processing operations to be addressed indirectly. This improvement comprises in combination: an array of n individual processor units which include an array of processor cells linked together by a plurality of connections; an array of n memory means, with each memory means being for storing one column of data for subsequent processing by a respective one of the processor units; and means for indirectly addressing data within the array of memory means by modifiying an address received from an external source of addresses by accessing a data value stored within the memory means.

According to a seventh aspect of the present invention, there is provided a method for addressing data in memory for subsequent processing by a processing system for performing processing operations in parallel upon data from any array of data having at least a plurality of rows and n columns where n is an integer greater than one. This method of addressing data comprises the steps of: (a) providing, as at least part of the processing system, (1) an array of n processor units, and (2) memory means for storing data from the array of data for subsequent processing by the array of processor units; (b) loading data from a first location the memory means into the array of processor units; (c) using the loaded data to specify a second location in the memory means distinct from the first location; and (d) loading data from the specified second location of the memory means into the array of processor units.

These and other aspects, objects and advantages of the present invention will be more fully understood by reference to the following detailed description taken in conjunction with the various figures and appended claims.

BRIEF DESCRIPTION OF THE DRAWINGS

The drawings form an integral part of the description of the preferred embodiments and are to be read in conjunction therewith. Like reference numerals designate identical components in the different figures, where:

FIGS. 6A and 6B illustrates a transpose operation;

DETAILED DESCRIPTION OF THE PREFERRED EMBODIMENTS

Figure 1:
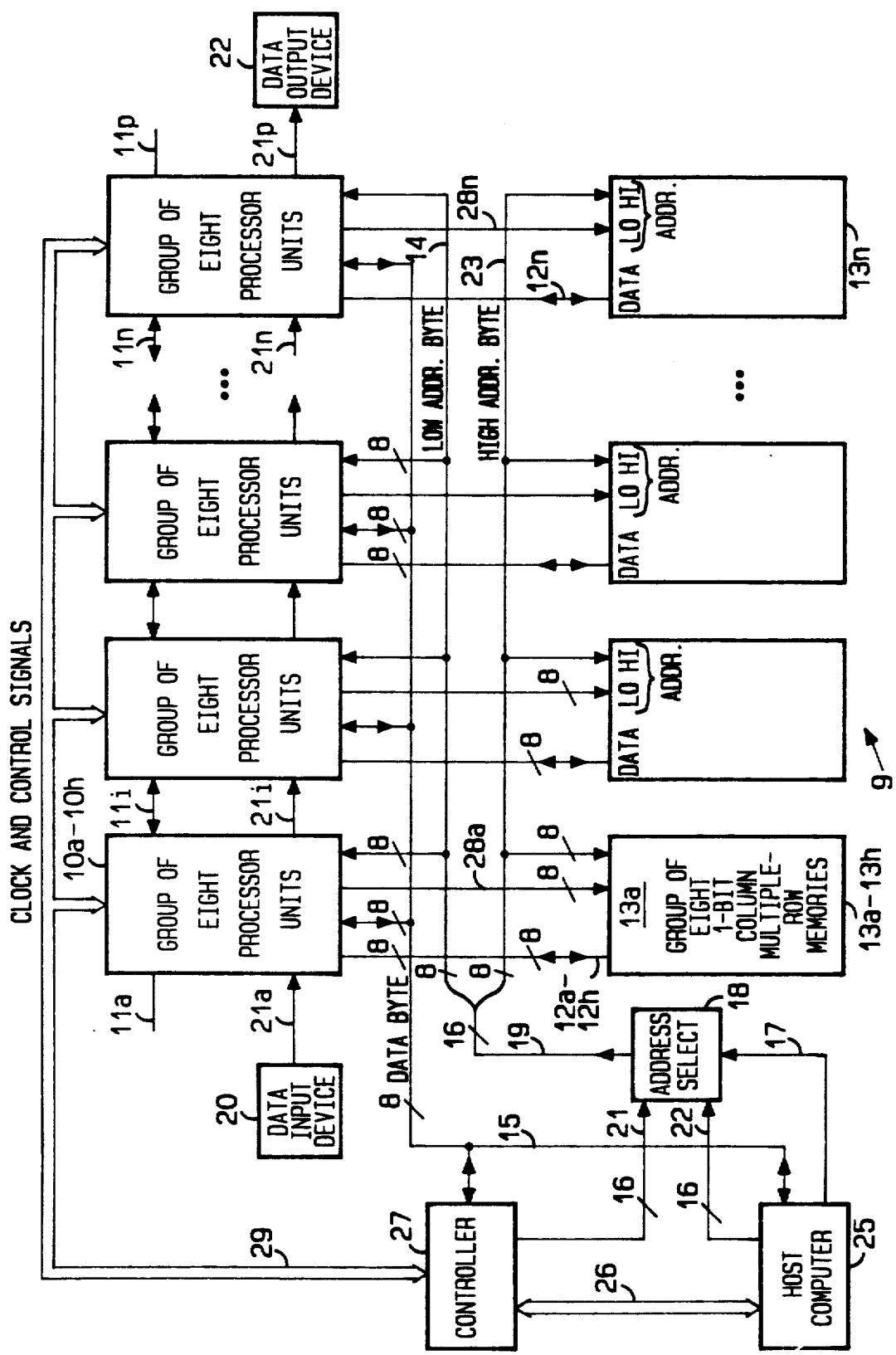
FIG. 1 is a block diagram of a parallel processing overall system of the present invention which employs a linear string of processor units.

Referring to FIG. 1, a parallel processing system 9 of the present invention comrises an array 10 of identical individual neighborhood processing units 10a-10n, and an associated array 13 of single-bit-wide memories 13a-13n. Each individual processing unit is respectively associated with an individual single-bit-wide column by multiple row memory, e.g., processing unit 10i is associated with memory 10i. The processor units are shown in groups of eight, for example 10a-10h. Likewise, the memories 13 associated with such groups of eight processor units are preferably constructed from byte-wide memories, and these memories 13 are also shown in groups of eight, for example 13a-13h. Neighborhood processing units 10b-10n receive neighboring data from adjacent processing elements on their immediate left or right via lines 11i-11n, for example. Each neighborhood processing unit 10a-10n also connects to associated memories 13a-13n by means of bidirectional data transfer lines 12a-12n. Data input device 20 provides a stream of data to first processing unit 10a via line 21a. Data are held in shift registers within the processing units with outputs passing to subsequent processing units via data shift lines 21i-21n, for example. Data is shifted thorugh a chain of shift registers within processor units 10a-10n and is output via data line 21p to output device 22. A host computer 25 sends controlling signals via lines 26 to controller 27. Both host 25 and controller 27 will send or receive data from the groups 10a-10n of eight processor units via lines 15. Host 25 is coupled to address select unit 18 via control line 17 wherein instructions derived from the signal on line 17 will cause selector 18 to pass either address signals from controller 27 via sixteen parallel bit lines 21 or address signals from host 25 via sixteen bit lines 22 through to sixteen bit output lines 19. Sixteen bit address lines 19 is shown split into two eight bit lines: low address byte lines 14, and high address byte lines 23. Low address byte lines 14 are coupled to groups of eight processor untis 10a-10n, where units 10a-10h are one example thereof. Eashc group of eight processors 10a-10h, for example, connects to associated memories 13a-13h via eight bit lines 28a-28n whose bits serve as the low address byte to memories 13a-13h therein. High address byte lines 23 are coupled to groups of eight memories 13a-13n. All processor unit groups 10a-10n receive clock and control signals from controller 27 via control lines 29.

FIG.. 2 shows a block diagram of a single processor unit 30, representative of any one of the processor units 10a-10n, which includes several external connections to identical adjacent processor units to the immediate left or right. Connections 36-38 and 41-44 on the right side of processor unit 30 correspond to right-side connections such as connections 11c, for example, associated with any one of the processing units 10a-10n shown in FIG. 1. Similarly, connections 34-36, and 41, 43, 45 and 47 on the left side of processor unit 30 correspond to left side connections such as connections 11a, for example, associated with any one of said processing units in FIG. 1. Also, I/O data connections 21e and 21f in FIG. 2 correspond to associated pairs of left and right data shift lines 21a-21p in FIG. 1; memory data connection 12e inFIG. 1 corresponds to an associated data transfer line 12a-12n; and host data connection 15e corresponds to one of the eight bit lines which constitute the dat byte lines 15 in FIG. 1.

Connections to the processor cell 30 on its left side are carry in line 34, west input neighbor line 35, and middle cell output line 36, which acts as a east neighbor input to the typical adjacent processor immediately to the left Connections to the processor cell on the right are carry out line 37, east neighbor input line 38, and middle cell output line 36, which acts as a west neighbor input to the typical adjacent processor immediately to the right The functions of the foregoing connections to and from processor cell 30 and the purposes thereof will be made clear in a later detailed discussion of the processor cell.

A sixteen-bit accumulator 51 is composed of two identical sections, namely an accumulator high byte register 54 and an accumulator low byte register 55. Accumulator 51 has four different functions which include: sixteen bit bidirectional parallel in; sixteen bit bidirectional parallel out; sixteen bit shift register with a unidirectional serial input via line 40; and sixteen bit shift register with unidirectional serial input via line 63. Sixteen input connections are provided by eight bit lines 45 and 47, and sixteen output connections are provided by eight bit lines 41 and 43, which two pairs of lines respectively service the parallel in and parallel out ports of the combined sixteen stage shift register of accumulator 51 for shifting data therein to the east (via lines 41 and 43) and for receiving data therein from the west (via lines 45 and 47). Similarly, sixteen input connections are provided by eight bit lines 42 and 44, and sixteen output connections are provided by eight bit lines 41 and 43, which two pairs of lines respectively serve as the parallel in and parallel out ports of combined shift register of accumulator 51 for shifting data therein to the west (via lines 41 and 43) and receiving data therein from the east (via lines 42 and 44). Lines 41, 42, 43 and 44 connect to a similar accumulator in an adjacent (e.e., nearest neighbor) processor unit 30 to the immediate east. Lines 45, 41, 47 and 43 connect to a similar accumulator in an adjacent processor unit to the immediate west. Accumulator low byte register 55 also is connected to memory line 12e which is provided as an input thereto, and can serve to increment the value of the data stored by register 55 therein. A carry out signal of register 55 on line 53 serves to carry the incrementing process overflowing register 55 to high-byte accumulator register 54 therein. Line 62 is a serial shift output line from accumulator high byte register 54. During the aforementional serial shift operations, selector unit 60 is instructed by signal derived from control line CON1 to pass the logic state of either line 62 or line 12e to selector output line 63, which is coupled to the serial input of accumulator low byte register 55. It is thus apparent that during serial shift operations, serial input to the accumulator low byte register 55 can be derived from either the memory data line 12e or from the serial output 62 of accumulator high byte register 54. Any of four above-noted functions of accumulator 54 and 55 are selected by instructions derived on command lines CON2 and are activated upon receiving a clock signal via respective lines CLK1 and CLK2. A more detailed description of the accumulator and its functions is provided later.

Any one of the sixteen accumulator output lines 41 and 43 can be selected by selector 50 with instructions derived from control lines CON3. The logical state (0 or 1) of the one accumulator line selected by selector 50 is provided on line 52, which is input to the processing cell 31 and to an output selector unit 33.

Coupled to output selector 33 are seven input signals 15e, 56, 52, 71, 72, 73 and 74. Based upon instructions received on control lines CON5, selector 33 will select and transfer the logical state of one of these seven input signals to output line 70. Line 70 is coupled to a three-state gate 76 controlled by control line CON6. The logic signal on output line 70 is transferred to memory data line 12e and can be written into memory 13e if the output of gate 76 is enabled by an appropriate instruction provided on control line CON6. If the instruction on line CON6 commands that gate 76 assume an inactive state, the gate's output will switch to a high impedance state, thus allowing memory 13e to access line 12e and write data therein if so instructed. In the same basic manner, data from seven different sources of data connected to each processor unit 10a-10n can be written into its respective memory of the plurality of memories 13a-13n These seven sources include data from (1) the host data bus via line 15e; (2) the I/O unit 32 via line 56; (3) any selected output from accumulator 31 by means of accumulator output selector 50, via line 52; (4) the "condition" signal via line 71; (5) the "function" signal via line 72; (6) the "carry register" signal via line 73; and (7) the "transpose" signal via line 74.

I/O unit 32 is an eight-bit, unidirectional, parallel-in, parallel-out, serial-in, serial-out shift register. The parallel inputs are received from eight input lines 21e; and parallel outputs are transferred to eight linrd 21f. The lines 21e and 21f are typical examples of lines 21a-21n shown in FIG. 1, and are connected respectively to adjacent processor units 10 on the immediate east and west. The serial-in signal to I/O unit 32 is obtained from memory data line 12e. The serial-out signal from I/O unit is output on line 56 to output selector 33. Either a parallel or serial shift function is selected by an instruction receivced on control line CON4, which is clocked iinot I/O unit 32 upon receipt of a clock signal on line CLK3.

Data Input

Input data to be processed by the system 9 of this invention will come from data source 20 (see FIG. 1) preferably in a raster scan format, that is the input data will be provided in the form of a stream of H successive rows of data, with each row having a length of n data bytes. Thyus, it may be appreciated that the data to be processed constitutes a data matrix having a height of H rows and a width W of n Bytes. The system 9 accepts the incoming data row by row, for example, from the output buffers of a solid-state imaging device such as a CCD scanning device. This data stream is delivered via lines 21a to the parallel-in input of I/O shift register 32. Data in a frist row of bytes is input to the system in two steps, as follows. Step 1: Controller 27 clocke all the I/O shift registers 32 to the east synchronously n times until the data stream of the first row is compleletly stored in all I/O shift registers 32 in all processor units 10a-10n. Step 2: A first row of bits from the first row of bytes is read out of all of the I/O shift registers 32 via their respective lines 56 and trnsferred to memory data lines 12a-12n via output selectors 33 and gates 76. As part of this read-out operation, controller 27 supplies the desired addresses for memories 13a-13n via lines 21, address selector 18, and address lines 19 (see FIG. 1). In a similar manner, controller 27 causes the other seven rows of bits from the first row of bytes to be stored by successively supplying further addresses tomemories 13a-13n while synchronously clocking the I/O shift registers 32 serially via lines CLK3 and CON4 so that successive rows of bits are read out to the lines 56. The above-mentioned two step process is repeated until all successive rows of the data matrix are transmitted from data input device 20 to memories 13a-13n.

Data Output

The results after the processing of a data matrix by the system 9 can be output through I/O shift registers 32 by means of a two-stpe process which is a reverse of the process mentioned above for data input, and is as follows. Step 1: First, controller 27 (see FIG. 1) supplies the address of a desired frist row of data bits to be output to memories 13a-13n, via lines 21, selector 18, and address lines 19, and causes the rows of bits of the specified memory addresses to be clocked up into the serial inputs of I/O shift registers 32. Controller 27 proceeds in a similar manner by causing different addresses (e.g., addresses of adjacent, successive rows of data bits) to be supplied to memories 13a-13n until all eight bits of the desired first row of data bytes are output from memories 13a-13n into shigt registers 32 via lines 12a-12n. Step 2: Next, controller 27 clocks I/O shift registers 32 a total of n times, so as to cause the eight bits of data to be shifted to the east via lines 21b-21p, so that the entire first row of data bytes consisting of eight rows of data bits enters output device 22 via line 21p. The above two-step process is repeated until all desired rows of the data matrix are transmitted from memories 13a-13n to data output device 22.

Data frm memory 13e can be delivered to the host data bus line 15e by activating or enabling three-state gate 78 with a control signal received by gate 78 from line CON7. In like manner, data can be read or writted directly between the host computer 25 and any of the memories 13a-13n.

Figure 3:
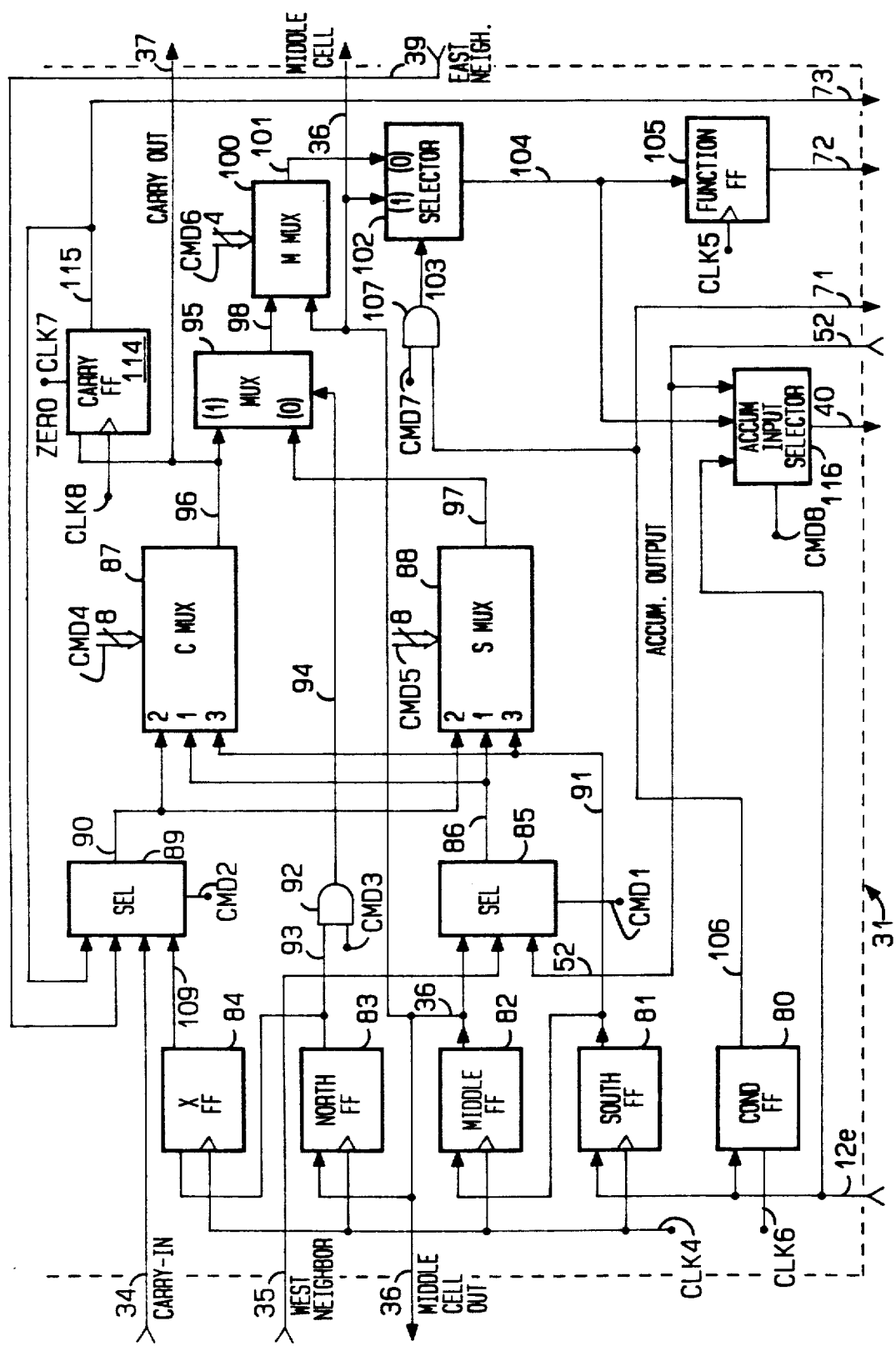
FIG. 3 is a detailed schematic of the processor cell in of the FIG. 2 processor unit.

Now referring to FIG. 3, a detailed schematic diagram of a processor cell 31, which has a number of logic gates, flip-flops, selectors, and multiplexers, is shown. External command signals are depicted by and received on the lines labeled with the prefix "CMD"; clock signals are similarly depicted and rece%ived on the lines labeled with the prefix "CLK." (The other external signal lines are designated with reference numerals consistne with those used in the other Figures.) Processor cell 31 can be placed in various functional states depending upon the combination of command signals it receives. This enables processor cell 31 to perform a wide variety of processing functions, each of which will now be explained in detail.

NEIGHBORHOOD OPERATIONS

It is commonly known that neighborhood processing is the transformation of an entire matrix of numbers or elements, wherein the transformation of each element of the matrix involves a function which uses the nearby neighbors of the element as independent variables. In order to perform nieghborhood processing operations using the system 9, three steps are required, as follows. First, data must be read from the associated memories 13a-13n into processing units 11a-11n, which units are each provided with enough on-board storage to hold nearest neighbor data in the horizontal and vertical directions for the element to be transformed that is currently associated with each processing unit. Secondly, the processing unit computes a transfromation of the neighboring data according to some specific instruction, thereby modifying the data. Thirdly, the modified data must be written back into associated memories 13a-13n. These three steps are respectively called the read subcycle, the modify subcycle, and the write subcycle. This sequence of three steps is called a read-modify-write cycle, and may be repeated many times in order to completely process all the data according to some specified algorithm.

Initial Read Operations

During a computation cycle involving nearest neighbor ooperations, a first read operation causes a complet line of single bit data to be read from memories 13a-13n via lines 12a-12n into processing untis 10a-10n depicted in FIG. 1. The data being read in is loaded into flip-flops in the processing units for temporary storage, under the control of clock signal CLK4 applied thereto, of which south flip-flop 81 depicted in FIG. 3 is typical. The data therein each correspond to a single bit in a first row of bits of the matrix stored in the memories 13a-13n. A second read operation of an adjacent row of bits, which operation includes another clock signal on line CLK4, causes the first bit stored in flip-flop 81 to shift up into middle flip-flop 82, while the second bit of data now occupies flip-flop 81. Any read operations thereafter are called read subcycles. The initial read operations are often referred to as "filling the pipeline".

Read Subcycle

A third read operation which accesses the next adjacent row of data, in a like manner causes a further shifting of data so that the group of flip-flops 81, 82 and 83 contain bits from three adjacent rows of single bit data. Further read subcycles will cause the next set of three adjacent bits of data to occupy this group of flip-flops. Accordingly, the flip-flops 81-83 will contain a set of nearest neighbor data for a specific row in the north and south directions. As should be apparent to those in the art, neighboring processing cells 31 on the immediate left and right of the processing cell 31 depicted in FIG. 3 contain data bits which correspond to the east and west neighbors of the FIG. 3 processor cell, and that output line 36 from the middle flip-flop 82 provides the east and west neighbor states for the processor cells adjacent to the FIG. 3 cell on the right and left respectively.

MODIFY SUBCYCLE

For neighborhood operations, selector 85 is instructed by signals received on command lines CMD1 to pass the west neighbor signal on line 35 to output line 86, which delivers the signal to a first address input of carry (c) and sum (s) multiplexers 87 and 88. At the same time, selector 89 is instructed by signals received on commmand line CMD2 to pass the east neighbor signal on line 39 to output line 90, which delivers the signal to a second address input of multiplexers 87 and 88. The logic state of the south neighbor is output by flip-flop 81 on line 91 and is delivered thereby to a third address input of multiplexers 87 and 88. Command line CMD3 is set to a logic "1" so that due to well-known properties of AND gates, AND gate 92 effectively transfers onto line 94 the signal on line 93 which is the logic state of the north neighbor output by north flip-flop 83, where it is delivered to address input of multiplexer 95. If line 94 connected to the address input of multiplexer 95 is a logic "1" level, multiplexer 95 passes the signal on line 96 (which is the output by multiplexer 87) to its output port and line 98. If this address input is logic "0", multiplexer 95 passes the signal on line 97 (which is the output by multiplexer 88) to its output port and line 98. Those skilled in the art will recognize that arrangement of multiplexers 87, 88 and 95 illustrated in FIG. 3 forms a two-level multiplexer, with multiplexers 87 and 88 being the first level and multiplexer 95 being the second level. The collective action of this two-level multiplexer is that of a "truth table" having sixteen possible states. The logic values of this truth table are derived from the states of command line inputs CMD4 and CMD5, which each contain eight lines. The particular command line input which is chosen as the output in multiplexer 87 and in multiplexer 88 is determined by the state of the address inputs thereof. Since the addresses provided to the address inputs of multiplexers 87, 88 and 95 are derived from signals depicting the states of the north, south, east and west neighbors relative to the state of middle flip-flop 82, it is apparent that the output signal on line 98 represents a general truth table transformation of the foregoing neighborhood of logic states.

The transformation signal 98 and middle cell output 36 are coupled to two address inputs of multiplexer 100. The logic states of these two address inputs determine which one of four input signals received by multiplexer 100 on command lines CMD6 is selected, and provided by multiplexer 100 as an output on line 101. Multiplexer 100 thus acts as a truth table transformation of the middle cell 36 and the neighborhood transformation result on line 98. Line 101 and middle cell output 36 are input to selector 102, whose selection operation is controlled by the state of the input signal provided on line 103. A logic "0" on line 103 will casue selection and passing of the signal on line 101, while a logic "1" thereon will cause selection of the signal from the middle cell on line 36. The output of selector 102 is called the function output, and its logic value is transferred to or imposed on line 104, for delivery to "function" flip-flop 105, where it is latched therein upon activation of clock signal CLK5.

A signal on memory data line 12e is latched into condition flip-flop 80 upon activation of clock signal CLK6. Output line 106 connected to and bearing the output or state of flip-flop 80 is coupled to AND gate 107. Command line CMD7 is also coupled to AND gate 107. The condition flip-flop 80, AND gate 107 and selector 102 collectively form a conditional enable circuit, where the state of said condition flip-flop 80 controls whether the function flip-flop 105 will latch the state of the function output of selector 102 as determined by line 101 or use the state of the middle cell as received as received via line 36, which represents the untransformed state. This conditional enable operation thus provides a means for selectively allowing some processing cells 31 to obey neighborhood transformation instructions received on command lines CMD1-CMD6 while allowing other cells 81 to effectively ignore such transformation instructions. The above conditional operation of the processing cells 31 can be deactivated by a logic "0" command on command line CMD7.

Write Subcycle

Figure 2:
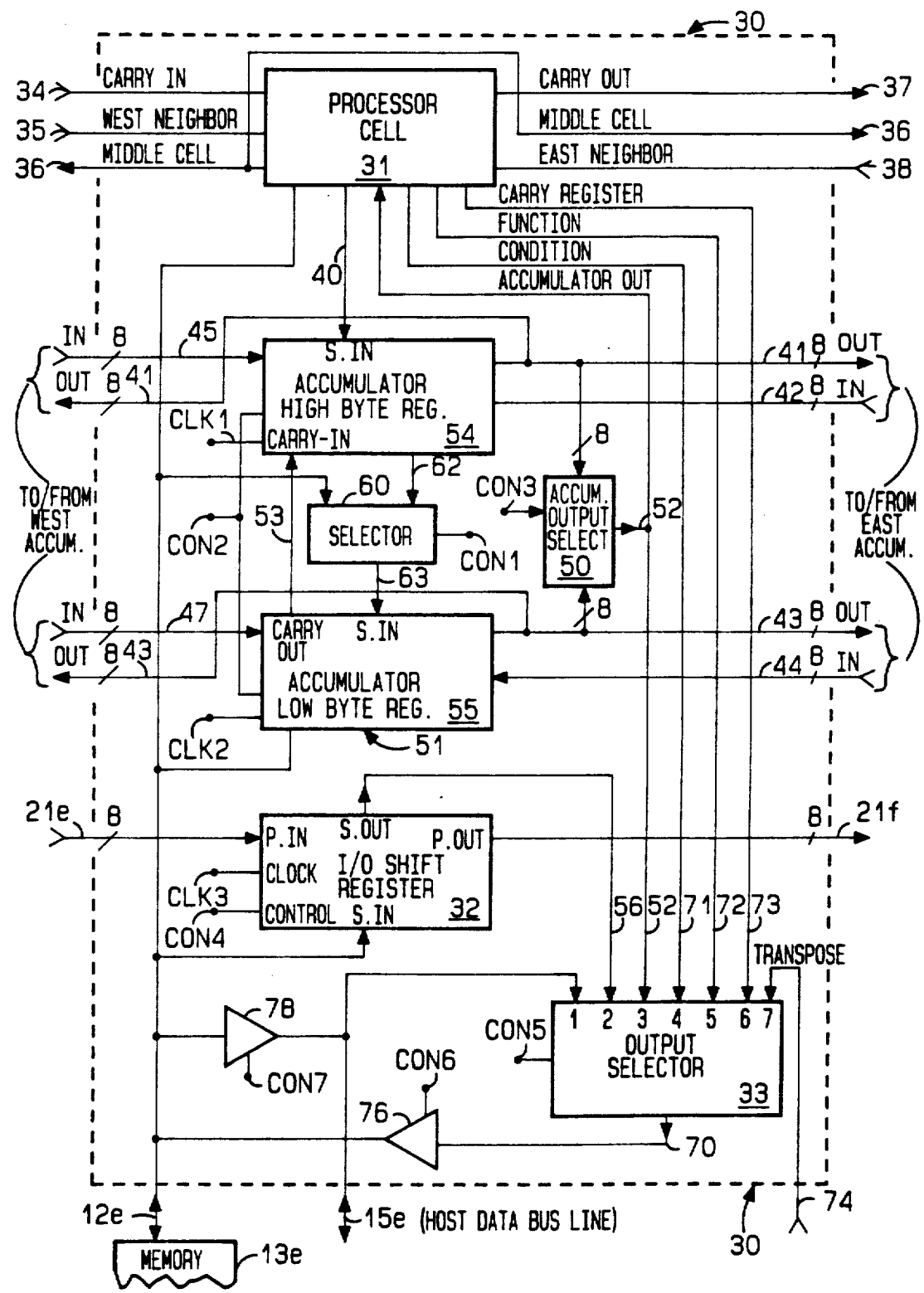
FIG. 2 is a block diagram of a typical single processor unit.

Referring to FIG. 2, the function output state on line 72 is selected by output selector 33 according to instructions on command line CON5, and passed thereby through gate 76 to memory data line 12e where it is then written into memory 13e.

BOOLEAN OPERATIONS

Boolean operations (e.g., combinational logic operations) are functionally similar to neighborhood operations, with the major difference being that any (arbitrary) lines of data bits may be written to flip-flops 81, 82, 83 and 84 of cell 31 illustrated in FIG. 3, and not just consecutive data bits from adjacent rows of bits in the data matrix, as is required to perform neighborhood operations. Boolean operations are performed by the system 9 in the following manner. According to some specified algorithm, controller 27 of FIG. 1 addresses memories 13a-13n and causes four rows of bit data to be read successively while clocking lines CLK4 so that flip-flops 81-84 (which are connected as a four-stage shift register) of the processor cells 31 receive and hold the four rows of data. Thereafter, each of the cells 31 are configured and operate in the following manner. Selector 85 is instructed by signals on command lines CMD1 to pass the middle cell state on line 36 to output line 86 and first address input of multiplexers 87 and 88, while selector 89 is instructed by signals on command lines CMD2 to pass the output of the X flip-flop signal on line 109 to its output and line 90, which leads to the second address input of multiplexers 87 and 88. CMD3 is set to a logic "1". In a manner analogous to but different from the neighborhood operations, this new configuration of multiplexers 87, 88, and 93 collectively forms a general truth table transformation of the four states in flip-flops 81-84. Instructions from command signals CMD6 set the M multiplexer 100 so that it will pass only the state of input 98 to output line 101. The condition flip-flop 80, AND gate 107 and selector 102 collectively form a conditional enable in a similar manner to that in the neighborhood transformation. The resulting Boolean function output state of selector 102 is latched into flip-flop 105 and thereafter written back to memory 13e in the manner described with respect to the neighborhood operations.

Those in the art will readily appreciate from the foregoing that the above-mentioned control and command operations allow the processor cells 31 to perform arbitrary truth table transformations on a set of four arbitrary rows of data bits, based upon a truth table established by the state of command signals CMD3 CMD4 and CMD5.

Booloean Operations with Accumulator

If selector 85 is instructed by command signals CMD1 to pass the logic state of accumulator output 52 to output line 86, then the Boolean transformation will involve the accumulator data in the operation. This configuration results in more processor flexibility and higher speed in some types of operations.

ARITHMETIC OPERATIONS

Bit Serial Arithmetic

To perform a computation cycle involving bit serial arithmetic, the CLK7 comand coupled to the reset input of carry flip-flop 114 is momentarily activated (i.e., pulsed) so that the logic state therein is set to zero therewith. Next, a line of data corresponding to the least significant bit of a first data word is read from memories 13a-13n and clocked into south flip-flop 81 in a manner similar to that for neighborhood or Boolean operations. Next, a least significant bit of a second data word is read from the memories, with the result that middle flip-flop 82 contains the state of the first bit and south flip-flop 81 contains the state of the second bit. Selector 85 is instructed by signals on command lines CMD1 to pass the state of middle flip-flop 82 output on line 36 to output line 86 and first address inputs of multiplexers 87 and 88, while selector 89 is instructed by signals on command lines CMD2 to pass the carry signal on line 115 (from the output of the carry flip-flop 114) to line 90 and the second address inputs of multiplexers 87 and 88. Output line 91 of south flip-flop 81 is the third address input to multiplexers 87 and 88. The states of command lines CMD5 are set in such a manner that "S" multiplexer 88 gives the truth table for a one bit sum or addition of the input values stored in flip-flops 81 and 82 and carry input value stored in flip-flop 114. Specifically, the states of command lines CMD4 are set in such a manner that "C" multiplexer 87 acts as a truth table for a carry propagate value for the three input values onto line 96. The resultant carry propagate value and addition value are respectively stored in carry flip-flop 114 and function flip-flop 105 by activation of respective clock signals CLK5 and CLK8. The state of function flip-flop 105 is output on line 72 and can be read back to memory 13 as is done in neighborhood operations.

Next, the next least significant bits from the same first data word and second data word are read into flip-flops 81 and 82 and are processed in a manner identical to the above. New arithmetic sum values are generated and written to memories 13a-13n, and new carry propagate values are generated and stored in flip-flop 114. By repeating the foregoing process steps two (or more) data words having any arbitrary number of bits can be added together. Also, conditional arithmetic operations can be readily provided through use of conditional flip/flop 80, as described earlier, in conjunction with the aforementioned serial arithmetic procedures.

Bit Serial Arithmetic with Accumulator

Selector 85 may be instructed by signals on command lines CMD1 to pass the logic state of accumulator output line 52 therein to output line 86 of selector 85, and then the resulting arithmetic operation will invlove the addition of bits of data words written inot flip-flop 81 from memory, with words previously stored in the accumulator 51 and received via line 52.

Parallel Arithmetic

During arithmetic operations, selector 89 may be instructed by signals on command lines CMD2 to pass the logic state of carry-in signal on line 34 therein to output line 90 of selector 89, then the carry input for processor cell 31 will be obtained from the processing cell 31 to the immediate left via line 34 and the carry output will propagate to adjacent processing cell to the immediate right via line 37. Thus, in order to perform correct parallel arithmetic operations, the data words. have to be arranged in the memories and processing units such that successively significant bits are contiguous in the horizontal direction, where the most significant bits are toward the right. To perform a computation cycle involving parallel arithmetic, a first row of data bits are read from memories 13e, with each bit being clocked into south flip-flops 81. Next, a second row of data bits are read from memories 13e, with each bit being clocked into flip-flops 81, and wherein the first data bits are clocked into middle flip-flop 82. As in bit serial arithmetic, sum and carry signals are computed; however, the carry signals will propagate to the right, and the sume of the data bits comprising the data word will be stable shortly after the second row of data bits are read from memory 13e. As in bit serial arithmetic, the resultant sum in each cell 31 is then clocked into its function flip-flop 105 and can be written to memory. It is also apparent that conditional parallel arithmetic operations and parallel arithmetic operations involving data from accumulators 51 are provided in a manner similar to that for bit serial arithmetic. When performing parallel arithmetic operations care must be used in writing algorithms in order to avoid overflow, so that carry signals will not accidentally propagate from one data word to the next, since many data words are on the same line of bits.

ACCUMULATOR

As best shown in FIG. 2, the accumulator 51 receives serial input signals from processor cell 31 via line 40, and from memory 13e via memory data line 13e. The serial input on line 40 is provided, as shown in FIG. 3, from accumulator input selector 116, which is instructed by signals on the command lines CMD8 to select either the memory signal on line 12e, or the function signal on line 104, or the accumulator output signal on line 52. The state of the selected input signal is passed through to selector 116 to its output and line 40 which is coupled to accumulator 54 shown in FIG. 2.

Figure 4:
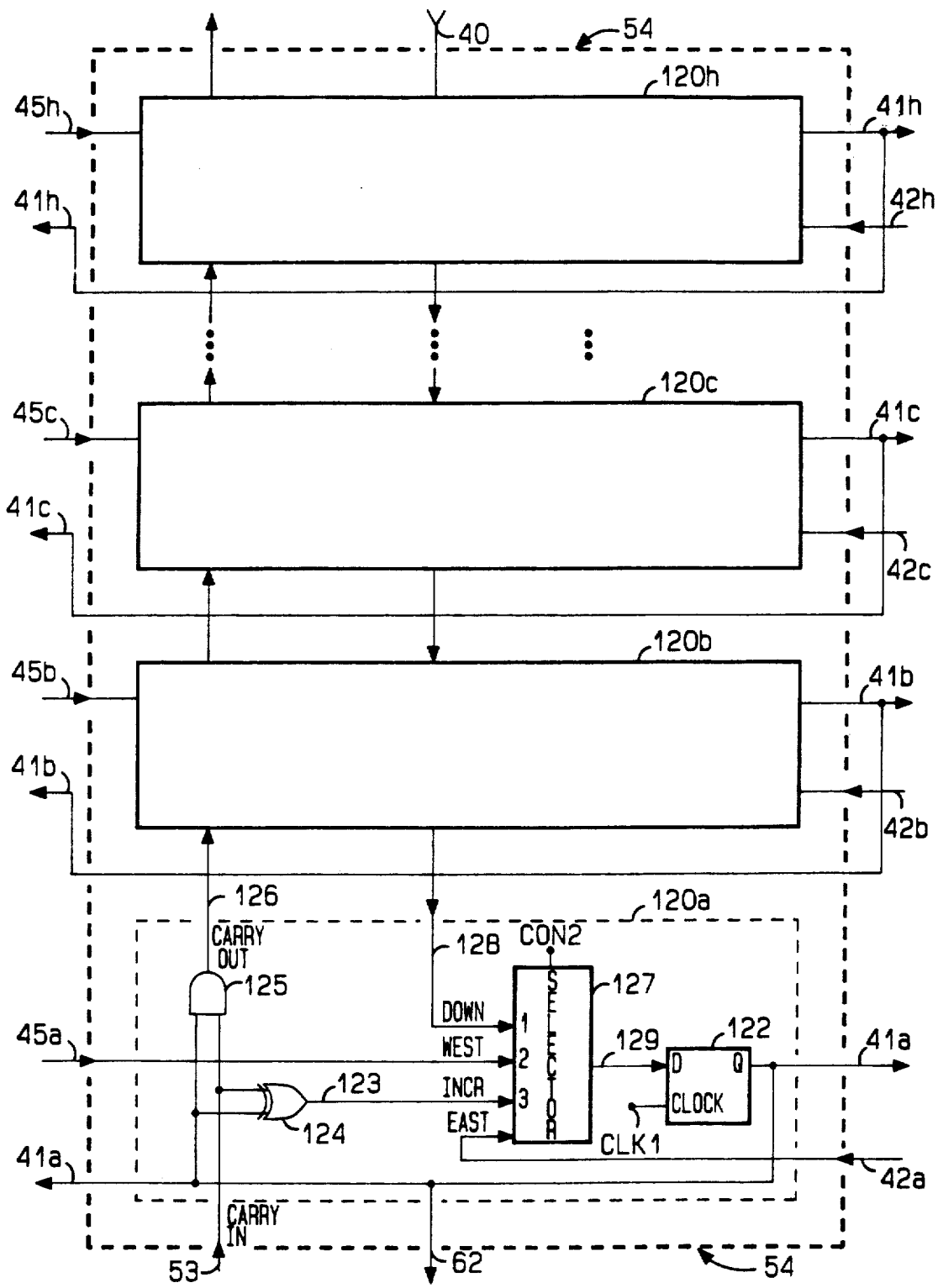
FIG. 4 is a detailed diagram illustrating the construction of eight accumulator cells which constitute of the accumulator high byte register of the FIG. 2 processor unit.

Now referring to FIG. 4, a diagram of accumulator high byte register 54 is shown within the large dashed rectangle, and eight one-bit accumulator units 120a-120h are provided therein. A detailed schematic of one of the untis, namely one-bit accumulator 120a, is depicted in the smaller dotted rectangle. The other one-bit accumulators 120b-120h are identical in construction to accumulator 120a, and thus need not be shown. Also, it should be understood that the lower section of accumulator 51, namely the accumulator low byte register 55 shown in FIG. 2 is identical in internal construction to the register 54. Returning to FIG. 4, the flip-flop 122 therein stores the value of one bit of eight bit word stored in accumulator section 54. One function performed by accumulator section 54 is the incrementing of the value of the word stored therein. Using the well-understood properties of exclusive OR gates, output 123 from exclusive OR gate 124 contains the value of the incremented bit therein, whereas the inputs thereof are line 41a (which provides the value of the bit stored in flip-flop 122), and the first carry input connected to line 53 (which is the last carry line from the lower byte accumulator section 55. Using a commonly known method, a carry propagate function is formed by AND gate 125, and its output on line 126 contains the carry-out signal which is provided as the carry-in signal to the next one bit accumulator 120b. Selector 127 is instructed by signals on control lines CON2 to pass as its output 129 the value of a selected one of four input signals, which are: (1) the value of the bit in accumulator unit 120b provided via line 128, (2) the value of a corresponding accumulator bit ot the west provided via line 45, (3) the incremented value provided via line 123, and (4) the value on line 42a from the corresponding accumulator bit in an adjacent accumulator 154 located to the east. The selected input signal is output to the accumulator filip-flop 122 via line 129, so that the selected value will be stored therein upon activation of clock signal CLK1.

From the above description, it should be readily apparent that accumulator section 54 can, upon receipt of the appropriate control signals, perform the following four functions: (1) increment the eight bity value stored therein by one or zero, depending on the state of its first carry input; (2) parallel shift all eight bit values stored therein east; (3) parallel shift all eighty bit values stored therein west; (4) serial shift the eight bits stored therein down, with the serial shift input value provided to high-order one-bit accumulator 120h by input line 40 being selected from various sources in the processor cell 31 (see FIG. 3).

Figure 5:
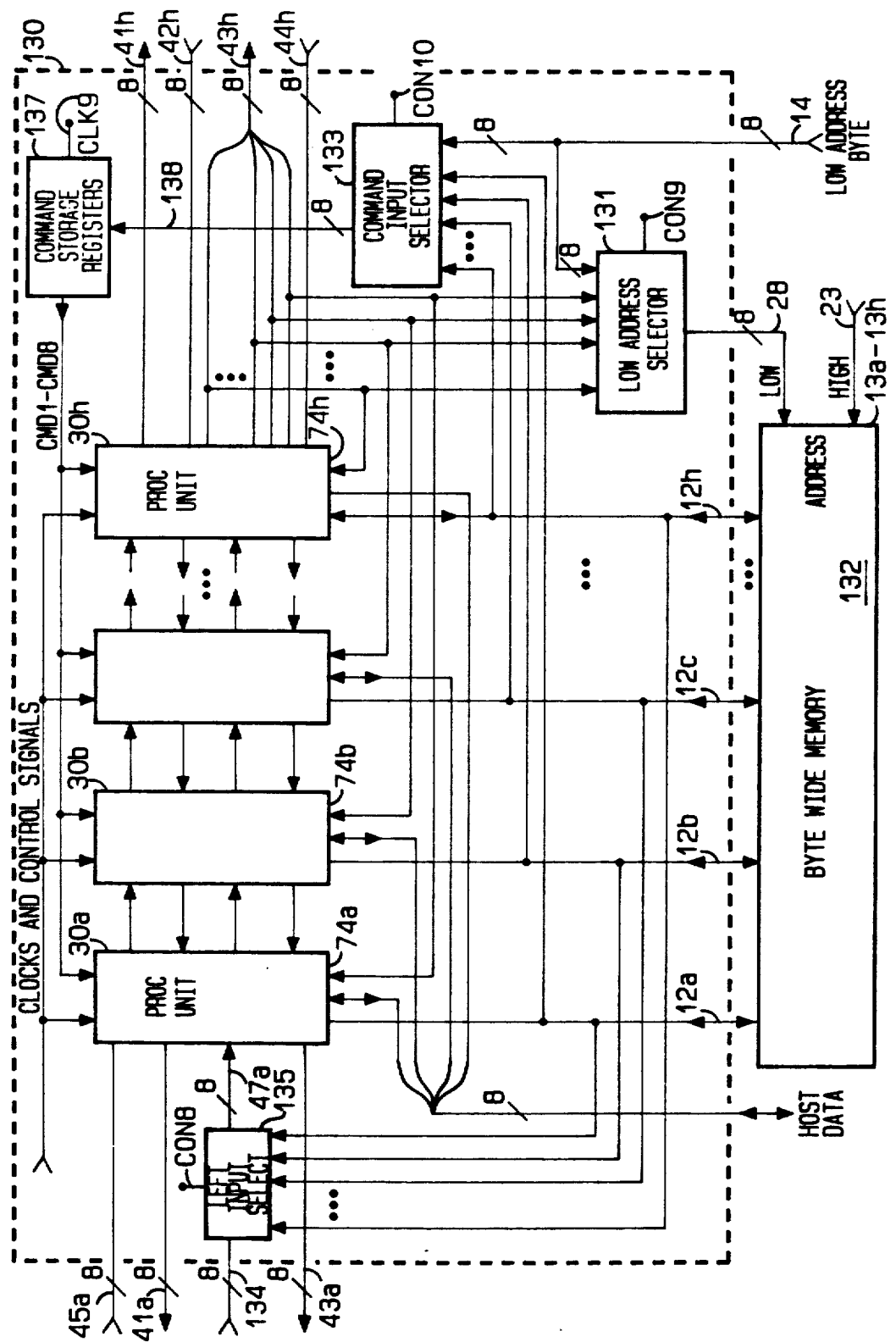
FIG. 5 is a block diagram of interconnections between a group of eight processor units and between a byte-wide associated therewith.

Referring to FIG. 5, processor units 10a-10n are logically arranged in groups of eight units, as further illustrated by representative group within the dashed rectangle 130, for three reasons: (1) the host computer data lines 15 are capable of reading eight bits at a time; (2) the memory associated with the groups 130 is provided most economically in the form of a byte wide memory 132; and (3) because further internal functions are best handled in eight bit sizes. Eight processor units 30a-30h are shown with accumulator inputs and outputs 45a, 41a, 47a and 43a on the left and 41h-44h on the right. Processor units 30a-30h are coupled to the memory 132 via eight data lines 12a-12h. Memory data lines 12a-12h are connected as a first input to accumulator left input selector 135, and the low byte input 134 of an adjacent accumulator is connected to a second input of selector 135. Instructions received on control line CON8 coupled to accumulator left input selector 135 will select either the first or second input, and transfer selected signals therein along input lines 47a of the accumulator low byte register 55 (see FIG. 2). The eight output bits of accumulator low byte register 55h within processor unit 30h, which are output on lines 43h on the east side of group 130, are also respectively connected to the transpose inputs 74a-74h of the processors 30a-30h. Each such transpose input is coupled to its output selector 33 (see FIG. 2) so that if its selector 33 is instructed by signals on lines CON5 to pass the transpose signal 74, then memory 13e will store the accumulator bits from accumulator register 55h therein.

Referring to FIG. 6A, and 8×8 grid 140 of bit values are shown. The grid 140 represents a small subarray of vertical bytes as they might be stored in memory 13, where A0-A7, B0-B7, C0-C7, etc., each represent a typical byte. There are two means of transposing data between the memory and accumulator, respectively called transpose in and transpose out, which will now be explained. Transpose in: The command signal on line CON8 (see FIG.. 5) is set to cause left input selector 135 to select the output from memory data lines 12a-12h for delivery via lines 47a to processor unit 30a. If the eight (horizontal) rows of the grid 140 of values are read from the memory 13 with most significant bits read first, and the eight adjacent accumulator sections 55a-55h within processing units 30a-30h are commanded to clock east in synchronization with the memory read instructions, then the data from grid 140 will be stored horizontally in these adjacent accumulator sections in the transposed form as shown in the grid 142 of FIG. 6B. Transpose out: If the data in the eight adjacent accumulator sections 55a-55h are stored as represented in grid 140 of FIG.. 6A, and if output selector 33 (see FIG. 2) of each processor unit 30a-30h is commanded to select transpose inputs 74, then data arraay of grid 140 will be stored in memory as shown in grid 142 of FIG. 6B, after eight memory writes synchronized with eight accumulator east shifts have been performed.

Eight parallel outputs of the accumulator low byte register 54h on the extreme right of FIG, 5 are also connected, via eight lines 43h, as a first set of inputs to low address selector 131. The eight low address byte lines 14 (see FIG. 1) are connected as a second set of inputs to selector 131. Instructions received on control line CON9 can set selector 131 to pass either accumulator output signals from the lines 43h, or the low address byte signals on lines 14, to lines 28, which are the eight least significant bits of an address delivered to memories 13a-13h located in byte-wide memory 132.

In light of the foregoing, it should be appreciated by those skilled in the art that controller 27 (see FIG.. 1) can address memories 13a-13n, and load numbers into the eight accumulator sections any desired group 130 of eight processor units within process units 30a-30n, and then use the loaded numbers in the east accumulator section 55h of the selected eight processor unit group 130 to address the memories 13a-13n again. This king of function is commonly known as indirect addressing. The data in the accumulator sections of group 130 can be shifted east and the indirect addressing can be repeated for the newly shifted values until all eight accumulators in the group have furnished indirect addresses to perform desired processing. Applications of this technique will be described in later sections.

Command input selector 133 in FIG. 5 can be instructed by signals received on control line CON10 to pass the states of either the low address byte 14 or the byte from memories 13a-13n received via lines 12a-12f to command storage registers 137 via lines 138. Upon activation of a clock signal on line CLK 9, data on input lines 138 will be latched into command storage registers 137. The command storage module 137 preferably is a four stage shift register which can store four bytes therein. Four clock cycles on line CLK9 are thus required to completely transfer a new set of four bytes of commands into the command storage register 137. The four bytes of data stored within command storage register 137 are output via command lines CMD1-CMD8 and serve as the multitude of the command signals shown in and used to operate the processor cell 31 of FIG. 3.

From the foregoing, it should be clear that data words for command storage module 137 for processing units 30a-30h of group 130 can be obtained from eighter the low address bytes by the lines 14 directly, or from memories 13a-13h, in which the low address byte lines furnish an address to memories 13a-13h via low address selector 131 and line 28. By means of the latter method, different groups 130 of processing units can simultaneously access different locations within memory 13, i.e., their respective assigned portions of memory 13, and received different commands previously stored in memory 13.

APPLICATIONS

Applications of the novel features of this invention, including the group of eight interconnected accumulators 55l -55h of group 130, transpose operations, and indirect addressing, will now be given. In the following discussion of these three applications, a detailed description of the precise commands and signal flows need not be presented since these rudimentary details have already been covered above, or may be very readily understood by referencing the above presentation.

Look-Up Table

Figures 7A, 7B, 7C:
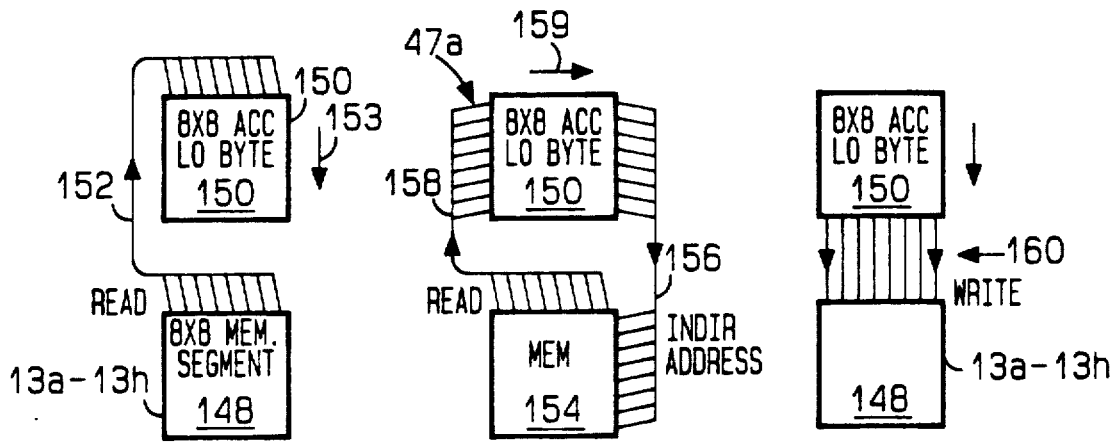
FIGS. 7A-7C depict signal flow for a look-up-table computation.

A look-up-table (LUT) is commonly used where each data element in a data array or matrix is to be transformed acording to a very complex rule.. Ordinarily it would be very time consuming to make a computation i accordance with such a rule for every data element. But if the computation was made once, off line, for each possible data value of the combination of independent variables or inputs, and the results stored as horizontal bytes in the memory 13a-13n, then the processor units 13a-13n only need look up that value from the stored LUT array for each data point. As an example of one implementation of the foregoing technique, consider the following mehtod illustrated in FIGS. 7A-7C. Assume a descired LUT is stored in memory 13 in a horizontal format as in FIG. 6B, and the data to be transformed in accordance with the entries in the LUT are stored in memory 13a-13h in vertical format as in FIG. 6A. The first step is to read eight such vertically stored data bytes represented by eight bit x eight bit segment 148 of the memories, 13a-13h into an 8×8 group 150 of low byte accumulators 55 while clocking the accumulators 55 "down", as depicted in FIG. 7A, by signal flow lines 152 and arrow 153. To do this, the accumulator input selectors 116 of the processor cells 13a-13h need to pass the data from memory segment 148 of memories 13a-13h on lines 12a-12h to lines 40a-40h (see FIGS. 1 and 2). Eight clock cycles are required. Thereafter, during the second step data bytes stored in group 150 are used as an indirect addresses which will address the memory space 154 in memories 13a-13h where the LUT is addressed as depicted in FIG. 7B by signal flow lines 156. The number of rows in memory space 154 equals the number of rows in the LUT. The data byte transformed according to the LUT in space 154 is read out of memory as indicated by signal flow lines 158 and shifted east as indicated by arrow 159 into the accumulator group 150. The extreme right data byte is lost during the shift east and the next right-most data element occupies the extreme right position in group 150. Eight clock cycles are required to process all eight bytes during this second step. During these eight clock cycles, the data transformed by referencing entries in the LUT 154 is clocked east into the extreme left accumulator 55a of group 150 via input lines 47a, and in the process the data are transposed to the vertical format and held in group 150. Finally, as depicted in FIG. 7C by signal flow lines 160, the new transformed values held in group 150 are written back into memory 13a-13h in the vertical format. Eight more clock cycles are required in order to have the accumulators 55 of group 150 shift down fully, thus storing all eight transformed values. Typically, the transformed values are stored back into memory segment 148, but if desired, can be storedd at a different segment with the memories 13a-13h.

Histogram

Figures 8A, 8B, 8C:
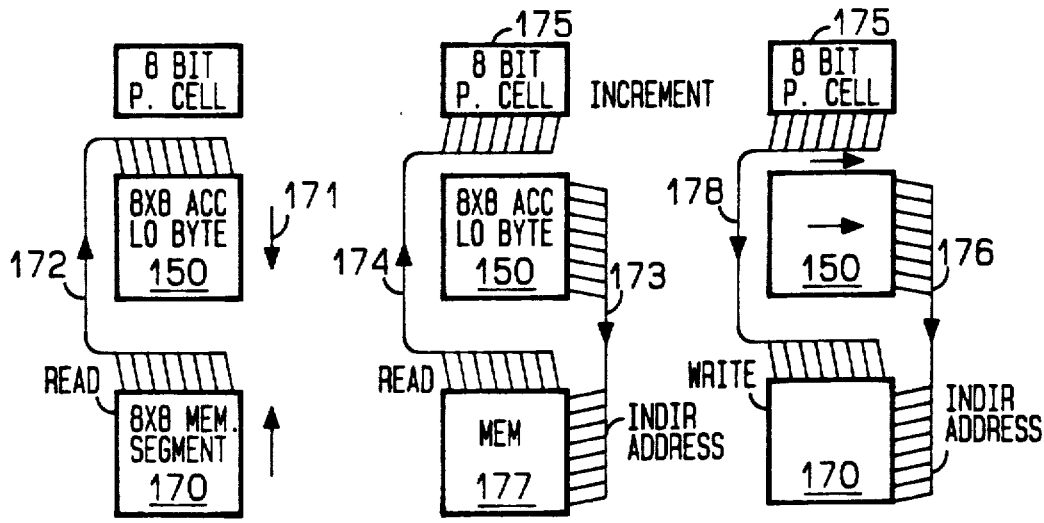
FIGS. 8A-8C depict signal flow for a histogram computation.

A histogram is a count of the number of times that each possible value of a group of data values occur in an entire data array, and is another operation which can be advantageously implemented by using the transpose and indirect addressing features of my invention. A preferred technique for generating a histogram using the system 9 of my invention is as follows. First, the area in memories 13a-13n where the various counts associated with the histogram are to be accumulated is zeroed out. Assume for the sake of this example that the data is in the vertical format in an array 170 in memories 13a-13h shown in FIG. 8A and the histogram count values will be accumulated in the horizontal format. A group of eight data bytes are loaded (serially downshifted) into the low byte accumulator group 150 as shown in FIG. 8A by arrow 171 and signal flow 172. The data value in the extreme right accumulator 55h of group 150 serves as an indirect address as indicated in FIG. 8B by signal flow 173 to the memory location (e.g., row) in memory segment 177 of memory 13 containing the count value for that particular data value. The count value is to be incremented, and is thus loaded into the eight bit-wide processing cell 175, as depicted in FIG. 8B by signal flow 174. Processing cell 175 may be composed of the processor cells 31a-31h in processor units 10a-10h, for example. The count in the processing cell 175 is then incremented using the horizontal arithmetic mode of the processing cell, as indicated in FIG. 8B. Using indirect addressing again, the incremented value is returned to the same memory location (row) from which it came, as depicted in FIG. 8C by signal flow lines 176 and 178. At the same time the accumulator 150 is shifted east to get ready for the next count of the next data value. The incrementing process illustrated in FIG. 8B and FIG. 8C occurs a total of eight times to count all the data loaded into the group 150 of eight accumulators during the step of FIG. 8A. All rows in the data matrix which spans, for example, several sets of eight-bit-wide columns in the memories 13a-13n are processed concurrently in a similar manner. Finally, after all rows within each set of columns have been processed, the several histograms, one for each group of eight columns, can be consolidated. Moreover, if a vertical format is needed, they can be transposed.

Accumulation

Figures 9A, 9B, 9C:
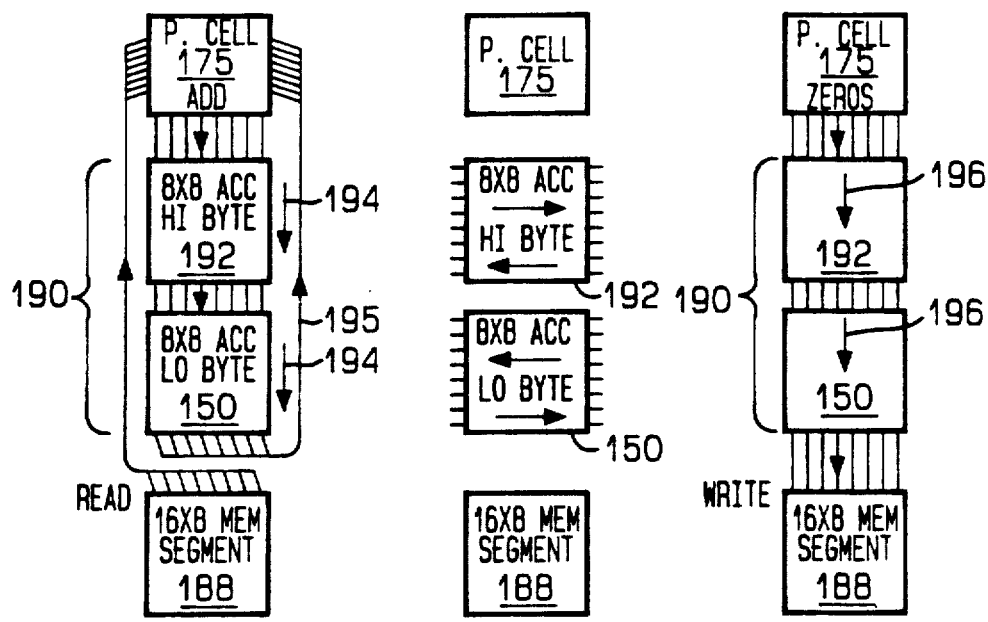
FIGS. 9A-9C depict signal flow for a data accumulation application.

FIGS. 9A-9C depict data flow paths for an example of accumulators being used within the accumulators. In FIG. 9A, data, namely 8 sixteen-bit values in vertical format, is read from eight-bit-wide, sixteen row memory segment 188 of memories 13a-13h in bit serial form to the processor cell 175. At the same time the sixteen-bit accumulator 190 is clocked as indicated by arrows 194 down and also read into the processing cell 175 as indicated by upward signal flow path 195, wherein the two data inputs are added. Accumulator 190 is formed from an eight-bit-wide by eight-bit-high accumulator section 192 (which may be the accumulator high-byte registers 54a-54h of eight adjacent processor units 30a-30h), and a corresponding 8×8 low byte accumulator group or section 150. The sum produced in cell 175 is read back into the accumulator 190 while it is shifting down. FIG. 9B illustrates that the accumulator 190 may be optionally shifted east or west if the next data value to be summed is in a different column of memory segment 188. The two phases or sequence of steps depicted in FIGS. 9A and 9B are repeated as many times as are needed to complete the desired summation of various data from near (or distant) neighbors. The shifts in either the east or west direction may be used to carry values or partial sums any arbitrary distance along the array of processing units 10a-10n; thus, the accumulation function is not confined to being performed within a given memory segment such as segment 188. This accumulation technique illustrated by FIGS. 9A and 9B will handle convolutions, or sums with various multiplication factors by using the familiar multiplication technique of "shift and add" well-known to those skilled in the art. When all desired data addition cycles are completed, the contents of the accumulator 190 are stored in memories 13a-13n by shifting the accumulator down as depicted in FIG. 9C by arrows 196. If desired, zeros may be shifted into accumulator 190 behind the outgoing data from processor cell 175. By shifting in zeros, the accumulator 190 is now ready to process another row of the data matrix.

Counting

Figures 10A, 10B:
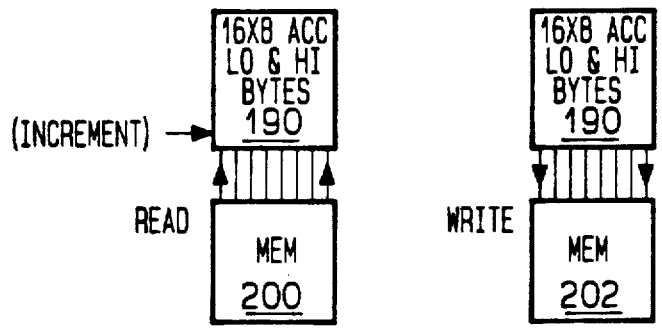
FIGS. 10A and 10B depict signal flow for a counting application.

FIGS. 10A and 10B depict a method of counting the number of bits in selected columns of a data matrix stored in memory using the system 9 of the present invention. The combined low byte and high byte accumulator group 190 is placed in the increment mode, as suggested in FIG. 10A. The accumulator group 190 is clocked while a byte-wide memory segment 200 of memories 13a-13h is read out, and a logic one bit in the data therein will increment the accumulator 190, whereas a logic zero bit therein will not alter the contents of the accumulator 190. Note that the segment 200 may contain an arbitrary number of rows. After all rows of data are processed, each one-bit accumulator 51a-51h within accumulator group 190 contains the sum of all logic "1" data bits in its associated data matrix column within memory segment 200. The sums within the one-bit accumulators of group 190 are shifted down and written into another byte-wide memory segment 202 of memories 13a-13h as depicted in FIG. 10B. Note that the sums thus stored in memory segment 202 are in a vertical data format of the type as illustrated in FIG. 6A, but will be sixteen bits high instead of eight bits high.

Add Constant

Figures 11A, 11B, 11C:
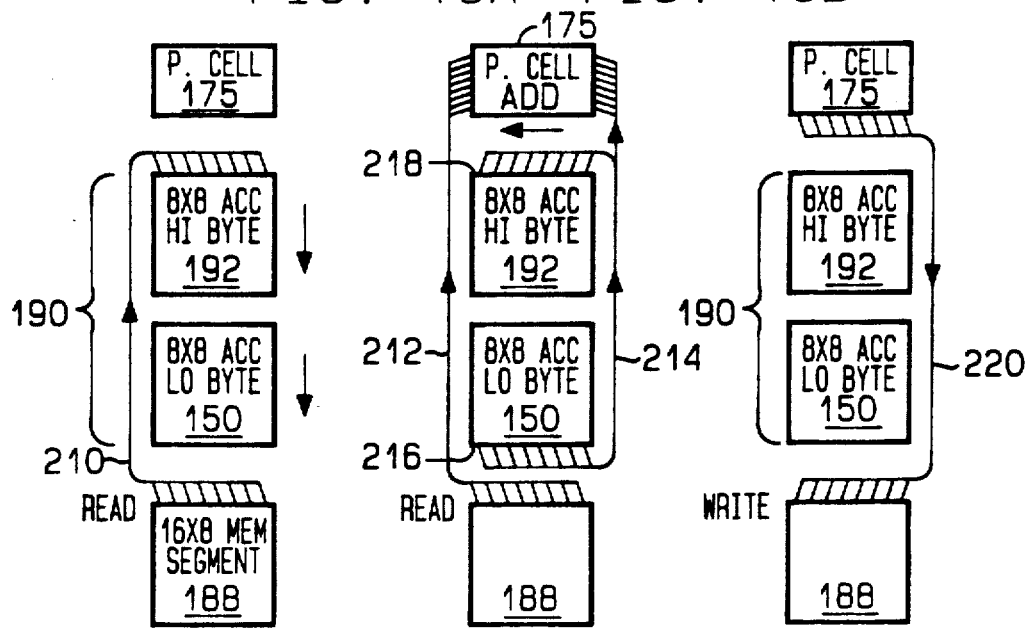
FIGS. 11A-11C depict signal flow for adding constants to a data matrix in memory.

Sixteen-bit constant numbers can be added to each element of a data matrix by first loading the numbers stored in vertical format within a 16 row×8-bit-wide memory segment 188 into the accumulator 190 as depicted in FIG. 11A by signal flow lines 210. In general the various one-bit-wide, 16-bit high accumulators 54a-54h within accumulator 190 can each contain a different number. Next, a bit serial addition occurs in the individual cells 31a-31h of processor cell group 175 in a sequence of two cycles. FIG. 11B depicts the first cycle where a row of least significant bits of the data matrix is read (as illustrated by signal flow 212) into the processing cell 175, while at the same time the accumulator 190 is shifted down once, and a row of eight bits is loaded into the processing cell 175 as indicated by signal flow 214. The row of accumulator output bits from the bottom 216 of accumulator 190 are recycled back to the inputs of the top 218 thereof. In the second cycle depicted in FIG. 11C, each resultant sum bit now in the individual cells 31a-31h of processing cell 175 is read into memory segment 188 as indicated by signal flow line 220. The cycles depicted in FIG. 11B and 11C are repeated for all remaining more significant bits in the data words stored in segment 188. After the sum is thereby completed, the bits in the accumulator 190 will have been completely recycled so that the numbers are registered as they were when they were originally loaded in FIG. 11A. The process can continue if desired in a like manner until all rows in the data matrix found in memory segments of memories 13a-13h other than segment 188 are processed.

From the foregoing, it can be appreciated that the system and method of my invention, which employs a linear chain of selectively interconnectable parallel processing units described herein, not only provides for the reliable accomplishment of the objects of the invention, but does so in a particularly effective and economical manner. It is recognized, of course, that those skilled in the art may make various modifications or additions to the preferred embodiment chosen to illustrate the invention without departing from the spirit and scope of the present contribution to the art. Also, the correlative terms "row" and "column," "vertical" and "horizontal," "left" and "right," "east" and "west," "up" and "down," and the like are used herein to make the description and claims more readily understandable and are not meant to limit the scope of the invention. In this regard, those skilled in the art will readily appreciate such terms are often merely a matter of perspective and are interchangeable merely by altering one's perspective, e.g., rows become columns and vice-versa when one's view is rotated 90 degrees. Also, although the architecture of the preferred embodiments disclosed herein is based primarily upon data words having eight bits, and processing data in arrays of 8×8 bits or 16×8 bits, it should be appreciated that my invention described herein can be readily adapted to data words of other sizes, such as from data words as small as 2 bits to data words as large as 32 (or more) bits, and process data in groups of correspondingly smaller or larger arrays. Accordingly, it is to be understood that the protection sought and to be afforded hereby should be deemed to extend to the subject matter claimed and all equivalents thereof fairly within the scope of the invention.

What is claimed is:

1. In a processing system for performing processing operations in parallel upon data from an array of data having at least N×N rows and N groups of N columns, where N is an integer greater than one, a method of transferring data between an array of N groups of N processor units and an array of N groups or N memory means, wherein each group of processor units in said array of N groups of N processor units includes a first processor unit, and wherein each said group of processor units and each said first processor unit in each said group is respectively associated with a group of memory means from said N groups of N memory means, said method comprising the steps of:
   (a) storing the array of data in the array of N groups of N memory means wherein each group of data in said array of N groups of N columns of data is stored in a row format;
   (b) transferring, from each group of memory means to its respectively associated group of processor units, a first group of N bits of data stored in the row format wherein said transferring step includes transposing said first group of N bits of data into a column format;
   (c) receiving, into each group of processor units, the first group of N bits of data transposed into the column format in step (b); and
   (d) performing step (b) by transferring the first group of N bits of data from the first row of the array of data to said first processor unit.

2. A method as in claim 1, wherein:
   each first group of N bits of data transferred during step (b) constitutes a first row of a group of N columns of data from said array of data;
   the column format is associated with each one of the processor units in the arrary of N groups of N processor units.

3. A method as in claim 2, wherein:
   each of the processor units includes accumulator means for temporarily holding data to be processed, wherein each accumulator means is linked by a plurality of connections to at least one accumulator means associated with an adjacent processor unit in the array of N groups of N processor units, with each accumulator means including at least N one-bit accumulators for receiving single bits of data, each accumulator means having a parallel input; and wherein
   step (b) is performed by transferring in parallel, each first group of N bits of data from the first row of the array of data into the accumulator means of a first one of the processor units located at a first end in each group of N processor units.

4. A method as in claim 3, further comprising the steps of:
   (d) shifting each first group of N bits of data transferred during the step (b) to the accumulator means of a second one of the processor units in each group of N processor units located adjacent to the first one of the processor units; and
   (e) transferring, from each group of memory means to its respectively associated group of processor units, a second group of N bits of data stored in a second row of the array of data to the accumulator means of the first one of the processor units located at the first end in each group of processor units.

5. A method as in claim 4, wherein the steps (d) and (e) are performed in synchronization.

6. In a processing system for performing parallel processing operations upon data from an array of data having L rows and at least M×N columns, where L, M and N are integers greater than one, the improvement comprising in combination:
   an array of M groups of N individual processor units;
   an array of M groups of N memory means for storing data from said array of data for subsequent processing by and transfer to the array of M groups of N individual processor units, whereby each memory means is connected to a respective one of the processor units, and each of the memory means stores one of the columns of the array of data; and
   an array of M transposing means, each one of said M transposing means being connected to a respective group of N individual processor units in said M groups of N individual processor units, each of said M transposing means being further connected to a respective group of N memory means in said M groups of N memory means, each of said transposing means for transposing N bits of data from the array of data stored within the respective group of N memory means such that the N bits of data from the array of data are transposed from a row format to a column format,
   wherein each transposing means includes left input selector means responsive to a control signal for selectively coupling a first one of the processor units within the respective group of N processor units to the respective group of N memory means such that data from said data array stored within said respective group of N memory means is transferred in parallel from the respective group of N memory means to the first one of the processor units.

7. A system as in claim 6, wherein:
   each processor unit in said array thereof further includes accumulator means for temporarily holding data to be processed, each accumulator means being linked by a plurality of connections to at least one accumulator means included in another processor unit in the array thereof, with each accumulator means including at least N one-bit accumulators for receiving single bits of data; and wherein
   each input selector means provides data from said array of data stored in the respective group of N memory means in parallel to the accumulator means of the first one of the processor units.

8. A system as in claim 6, wherein each transposing means includes N output selector means wherein each output selector means is connected between a processor unit and the processor unit's respective memory means, and wherein each selector output means is responsive to a control signal for selectively coupling a second one of the processor units within the respective group of N processor units to others of the same group of N processor units such that data is transferred in parallel from the second one of the processor units to the memory means through the N output selector means.

9. A system as in claim 8, wherein:
   each group of N processor units includes a plurality of connections for transferring data between processor units and a respective group of N memory means, and
   each one of the N selector means is connected to a respective one of the connections for transferring data between the processor unit connected to each selector means and the respective group of N memory means.

10. In a processing system for performing processing operations in parallel upon data from an array of data stored in memory means having L rows and M×N columns, where L, M and N are integers greater than one, the system including an array of M groups of N processor units each group of N processor units respectively linked with N columns of memory means, and each processor unit within each group of N processor units respectively linked to one of the N columns of said memory means, within the respectively linked N columns of memory means linked together along a common data bus, the array of processor units including means for transferring carry data between processor units which are adjacent to one another, the array of processor units further including means for storing and feeding back carry data within each processor unit, and wherein said system further includes controller means for controlling the operation of each processor unit, a method of performing arithmetic operations, comprising the steps of:
   (a) performing, in response to a first command by said controller means, arithmetic operations on the data from the array of data in each group of N processor units in parallel, by at least in part,
      (1) transferring carry data generated as a result of an arithmetic operation in one processor unit in one direction to a processor unit adjacent to said one processor unit, if any in that direction,
      (2) utilizing the transferred carry data in the arithmetic operation being performed in the adjacent processor unit; and
   (b) performing, in response to a second command by said controller means, arithmetic operations on the data from the data array by,
      (1) operating each processor unit in a bit serial mode to add data from a respective column of data within said data array and,
      (2) storing carry data generated as a result of the arithmetic operation in each one of the processor units in the carry storing means associated with each processor unit where the carry data is fed back and used in the next bit serial arithmetic operation conducted in each processor unit.

11. A method as in claim 10, further comprising the steps of:
   (c) loading data from a first location within each group of N columns of memory means into each group of processor units respectively linked to each group of N columns of memory means;

(d) using the loaded data to specify a second location within each group of N columns of memory means respectively linked to each group of processor units, each of said second locations distinct from each of said respective first locations; and (e) loading data from the specified second location within each group of N columns of memory means into each group of processor units respectively linked to each group of N columns of memory means.

12. A method as in claim 11, further comprising the step of:

(f) shifting said data loaded into each group of processor units from said first location within each group of N columns of memory means into a first one of the processor units within each group of processor units.

13. A method as in claim 10, wherein step (a) is performed within each group of processor units by:

(1) reading a first row of N data bits from each group of N columns of memory means linked to each group of processor units such that each bit from the first row is stored in a respective one of the processor units;

(2) reading a second row of N data bits from each group of N columns of memory means linked to each group of processor units such that each bit from the second row is stored in a respective one of the processor units; and (3) performing simultaneously in each of the N processor units a one-bit additions operation using as inputs to the addition operation in each processor unit the two bits stored therein as a result of substeps (1) and (2) and the carry data received from an adjacent processor unit.

14. A method as in claim 13, wherein:

each of the N processor units within each group of processor units comprise at least a two-stage serially interconnected clocked first flip-flop means for holding the two bits of data from the first and second rows of data bits therein, and each of the N processor units within each group of processor units further include a second flip-flop means for holding a sum bit resulting from the one-bit addition operation.

substeps (1) and (2) of step (a) are performed by clocking the first and second rows of data bits into the first flip-flop means of each of the N processor units, and substep (3) of step (a) is performed in part by clocking the sum bits resulting from the one-bit addition operation in each of the processor units into their respective second flip-flop means.

15. A method as in claim 10, wherein step (b) is performed within each group of processor units by:

(1) reading a first row of N data bits from each group of N columns of memory means linked to each group of processor units such that each bit from the first row is stored in a respective one of the processor units;

(2) reading a second row of N data bits from each group of N columns of memory means linked to each group of processor units such that each bit from the second row is stored in a respective one of the processor units; and (3) performing simultaneously in each of the N processor units a one-bit addition operation using as inputs to the addition operation in each processor unit the two bits stored within the carry storing means of each processor unit, whereby said carry data resulted from a previous addition operation in each respective processor unit.

16. A method as in claim 15, wherein:

each of the N processor units within each group of processor units comprise at least a two-stage serially interconnected clocked first flip-flop means for holding the two bits of data from the first and second rows of data bits therein, and each of the N processor units within each group of processor units further include a second flip-flop means for holding a sum bit resulting from the one-bit addition operation, substeps (1) and (2) of step (b) are performed by clocking the first and second rows of data bits into the first flip-flop means of each of the N processor units, and substeps (3) of step (b) is performed in part by clocking the sum bits resulting from the one-bit addition operation in each of the processor units into their respective second flip-flop means.

17. In a processing system for performing processing operations in parallel upon data from an array of data having L rows and M×N columns, where L, M and N are integers greater than one, the improvement comprising in combination:

an array of M×N individual processor units, each of the processor units comprising a processor cell, each of the processor cells being linked with each other by a plurality of connections;

an array of M×N memory means, each memory means connected to a respective one of the processor units within the M×N array of processor units, wherein each memory means stores one of said columns of data in said array of data for processing by the respective processor unit, each processor cell further including arithmetic means for performing arithmetic operations upon data provided thereto, each arithmetic means including carry means for trasnferring carry data resulting from an arithmetic operation performed within each processor cell to an adjacent processor cell, if any, located in a common first direction along the array of M×N processor units, such that the M×N processor cells operate in a word parallel mode to perform arithmetic operations upon rows of data from the array of data that are provided in parallel to the M×N processor cells; and each carry means also including a first means for storing and feeding back the carry data from the most recent arithmetic operation conducted by the arithmetic means associated with each carry means, such that each processor cell operates in a bit serial mode to add data from its respective memory means.

18. A system as in claim 17, wherein:

in each processor cell, the arithmetic means performs a one-bit addition operation, and each processor cell includes a second storage means for temporarily holding a sum bit resulting from the addition operation most recently performed, and each processor cell includes a carry-out connection between the first storage means and the arithmetic means of the adjacent processor cell if any located in the first direction.

19. A system as in claim 18, wherein:

each processor cell includes a pair of serially connected one-bit storage means for temporarily holding a pair of bits successively transferred thereto from the memory means associated with each processor cell for processing by the arithmetic means of each processing cell.

20. A system as in claim 19, wherein:

the array of M×N processor units includes a common command source means for simultaneously providing to the processor cells of the M×N processor units a plurality of multiple line command signals, and wherein each processor cell includes a two-level multiplexer means for performing various logical functions in response to multiple line command signals received thereby from the command source means, including a first logical operation to obtain a one-bit addition value, and a second logical operation to obtain a one-bit propagate value.

21. A system as in claim 20, wherein:

each processor cell further includes selector means for receiving the one-bit carry propagate value from the carry-out connection of its adjacent processor cell, if any, in resoponse to a command signal from the command source means, and for selectively passing the one-bit carry propagate value to said two-level multiplexer means.

22. A processing system for performing parallel processing operations upon data from an array of data having L rows and at least M×N columns, where L, M, and N are integers greater than one, and wherein said array of data is subdivided into M subarrays for processing, each subarray having L rows and N colums, comprising:

M groups of N processor units, each processor unit including a processor cell wherein all said processor cells within a single group of processor units are linked together by a plurality of connections, and wherein said M groups of processor units are linked together by a plurality of connections for transferring inforamtion between said M groups of processor units, and wherein each group of N processor units further includes command means for commanding an operating mode of the N processor units associated therewith;

M groups of N memory means, each said memory means in said M groups of N memory means for storing L rows of one of said M×N columns of said data in said data array, each said group of memory means in said M groups of memory means being respectively associated with a group of processor units in said M groups processor units, each of said memory. means within a single group of memory means being respectively linked to a processor unit within said respectively associated group of processor units;

each said processor unit further comprising means responsive to a first control signal issued by its associated command means, for selectively enabling said each processor unit's associated processor cell to operate in a first mode, whereby when all said processor cells within a single group of processor units operate in said first mode, said single group of processor units operate in parallel on said rows of data in said data array, and wherein said enabling means of each processor unit is responsive to a second control signal, issued by its associated command means, for selectively enabling said each processor unit's associated processor cell to operate in a second mode, whereby when all said processor units within a single group of processor units operate in said second mode, said single group of processor units operate in parallel on said columns of data in said data array.

23. A system as in claim 22, wherein:

each processor unit includes accumulator means for temporarily holding data to be processed, and wherein each accumulator means is linked by a plurality of connections to at least one accumulator means associated with an adjacent processor unit in said single group of processor units.

24. A system as in claim 23, wherein each accumulator means is linked to the memory means associated with each processing unit, and wherein each accumulator means includes 2N one-bit accumulators serially linked together, whereby each accumulator means receives and temporarily holds 2N bits of data from the memory means associated with the respective processing unit of the accumulator means.

25. A system as in claim 23, wherein:

each processor unit within each group of N processor units includes output selector means coupled to the accumlator means of a first one of the processor units within each group of N processor units, and responsive to a control signal, for selectively directing data from the accumulator means of said first one of the processor units to the group of N memory means associated with each group of N processing units, whereby data is transferred in parallel from the accumulator means of said first one of the processor units of each group of N processor units to the group of N memory means respectively associated therewith.

26. A system as in claim 25, wherein each group of N processor units further includes input selector means for selectively coupling the N processor units of each group and the group of N memory means associated with each group of N processor units to the accumulator means of a second processor unit within each group of N processor units, such that data is transferred in parallel from the group of N memory means and the N processor units of each group of processor units to the accumulator means of the second processor unit within each group of processor units.

27. A system as in claim 23, wherein each accumulator means is linked to the memory means associated with each processing unit, and wherein each accumulator means includes N one-bit accumulators each for temporarily holding one bit of data therein, and wherein the N one-bit accumulators associated with each accumulator means are serially linked together whereby the accumulator means receives and temporarily holds N bits of data from the memory means associated with the respective processing unit of the accumulator means.

28. A system as in claim 27, wherein:

a first one of the accumlator means within each group of N processor units is provided with at least N parallel output lines and N parallel input lines each of which respectively lead to one of the N processor units within the same groups of processor units.

29. A system as in claim 28, wherein:

each processor unit includes output selector means responsive to a control signal for selecting which of several output signals internally generated within each processor unit is delivered to and stored within the memory means associated with each processor unit.

30. A system as in claim 22 wherein each group of N processor units, further includes:
   means, linked between a first processor unit within each group of N processor units and the group of N memory means associated with each group of N processor units, for storing a source of addresses defining storage locations of data stored in each group of N memory means; and
   means respectively coupled with said storing means for indirectly addressing data stored within each group of N memory means by modifying addresses received from said means for storing the source of addresses.

31. A system as in claim 30, wherein said means for indirect addressing includes means for accessing a first value stored within a first location within each group of N memory means, and means forr obtaining a second address distinct from the first address for accessing a second value stored within a second location within each group of N memory means.

32. A system as in claim 30, wherein:
   each processor unit includes accumulator means for temporarily holding data to be processed, and wherein each processor unit is linked by a plurality of connections to at least one accumulator means associated with an adjacent processor unit; and wherein
   each group of N memory means includes address inputs; and wherein
   said means for indirect addressing includes address selection means, coupled to the accumulator means within said first processor unit, for selectively directing data in parallel from said accumulator means within said first processor unit to at least some of the address inputs of the associated group of N memory means.

33. A system as in claim 32, wherein:
   each processor unit includes means for shifting data within the accumulator means of each processor unit in a common direction to the accumulator means of an adjacent processor unit, if any.

* * * * *

UNITED STATES PATENT AND TRADEMARK OFFICE
CERTIFICATE OF CORRECTION

PATENT NO. : 5,129,092

DATED : July 7, 1992

INVENTOR(S) : Stephen S. Wilson

It is certified that error appears in the above-identified patent and that said Letters Patent is hereby corrected as shown below:

Column 20, line 53, change "arrary" to --array--.

Column 24, line 41, change "trasnferring" to --transferring--.

Column 25, line 24, change "resoponse" to --response--;

line 33, change "colums" to --columns--; and line 41, change "inforamtion" to --information--.

Column 27, line 19, change "forr" to --for--.

Signed and Sealed this

Seventh Day of September, 1993

Attest:

BRUCE LEHMAN

Attesting Officer    Commissioner of Patents and Trademarks